Figure 1:
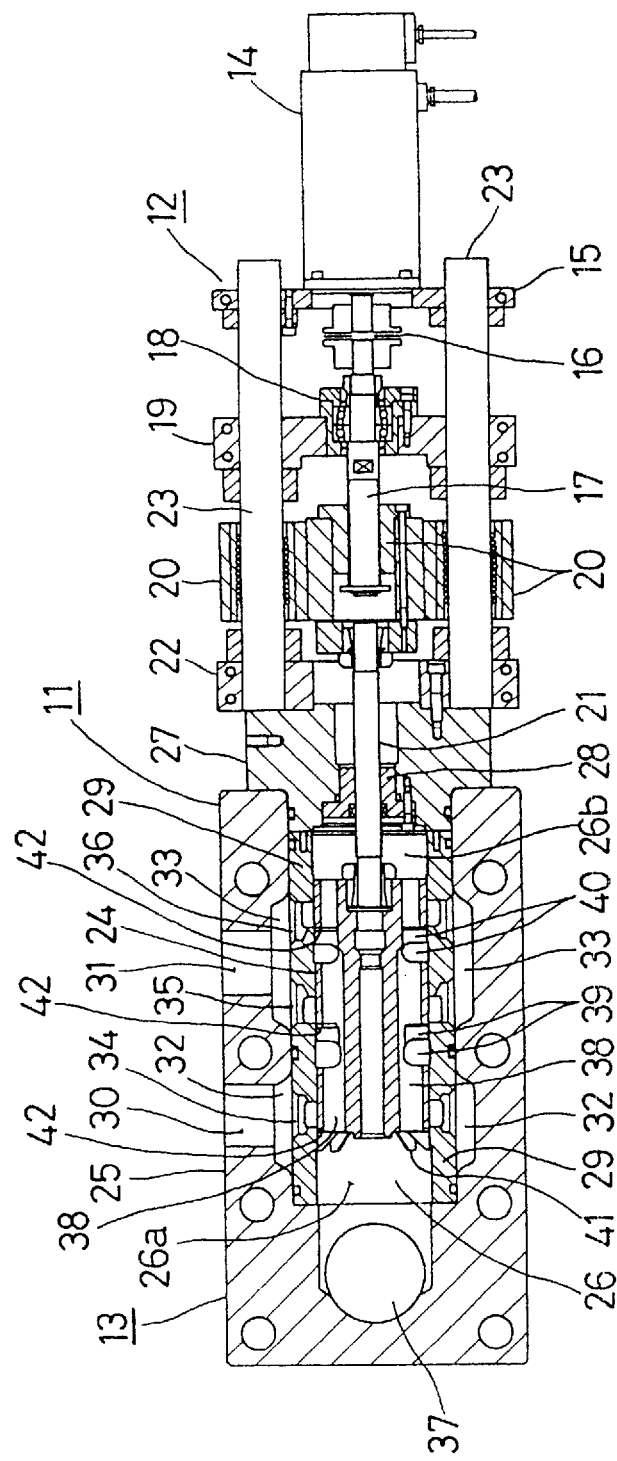

United States Patent [19]
Kurashima et al.

[11] Patent Number: 5,832,805
[45] Date of Patent: Nov. 10, 1998

[54] METHOD AND APPARATUS FOR CONTROLLING SPEED OF HYDRAULIC CYLINDER

[75] Inventors: Yasuhiro Kurashima; Takashi Yamane, both of Yamaguchi, Japan

[73] Assignee: UBE Industries, Ltd., Yamaguch, Japan

[21] Appl. No.: 535,194

[22] PCT Filed: May 1, 1995

[86] PCT No.: PCT/JP95/00860

§ 371 Date: Apr. 1, 1996

§ 102(e) Date: Apr. 1, 1996

[87] PCT Pub. No.: WO95/30094

PCT Pub. Date: Sep. 11, 1995

[30] Foreign Application Priority Data

May 2, 1994 [JP] Japan ........................................ 6/93333

[51] Int. Cl.[6] .............................. F15B 13/04; F15B 11/08
[52] U.S. Cl. .................................. 91/29; 91/31; 91/435; 91/436; 91/437
[58] Field of Search ................................ 91/31, 29, 421, 91/435, 436, 437

[56] References Cited

U.S. PATENT DOCUMENTS

| | | | |
|---|---|---|---|
| 4,141,280 | 2/1979 | Lorimor | 91/29 |
| 4,432,270 | 2/1984 | Kyster et al. | 91/436 |
| 4,566,477 | 1/1986 | Barker et al. | 91/29 X |
| 4,586,539 | 5/1986 | Veno | 137/625.38 |
| 5,251,705 | 10/1993 | Waggoner et al. | 91/436 X |

FOREIGN PATENT DOCUMENTS

| | | |
|---|---|---|
| 63-49113 | 3/1988 | Japan . |
| 3-28426 | 2/1991 | Japan . |
| 3-28501 | 2/1991 | Japan . |

*Primary Examiner*—Hoang Nguyen
*Attorney, Agent, or Firm*—Blakely Sokoloff Taylor & Zafman

[57] ABSTRACT

In order to improve speed controllability both in low and high speeds, thereby stabilizing the speed of a hydraulic cylinder, both the flow-in amount of hydraulic operating fluid flowing from a hydraulic source to the hydraulic cylinder having a run-around circuit and the flow-in amount of hydraulic operating fluid flowing from the run-around circuit to the hydraulic cylinder are controlled simultaneously by a control valve, so that the speed of the hydraulic cylinder is controlled.

12 Claims, 5 Drawing Sheets

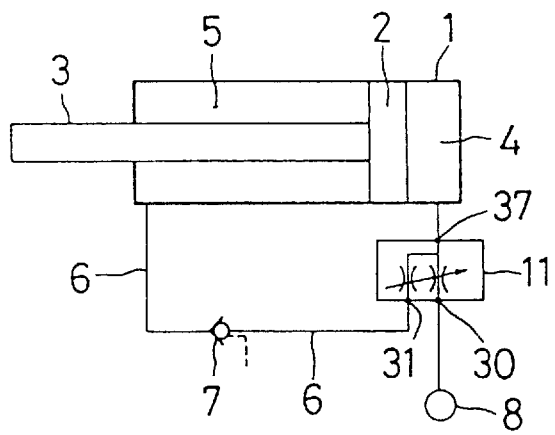
F I G. 6

5,832,805

METHOD AND APPARATUS FOR CONTROLLING SPEED OF HYDRAULIC CYLINDER

1. TECHNICAL FIELD

The present invention relates to a method and apparatus for controlling the speed of a hydraulic cylinder used as the injection cylinder of, e.g., a die casting machine or an injection molding machine.

2. BACKGROUND ART

It is conventionally known to incorporate a flow regulating valve described in, e.g., U.S. Pat. No. 4,586,539 in the hydraulic circuit of the injection cylinder of, e.g., a die casting machine.

This flow regulating valve is a single compact valve serving as four valves, i.e., a flow regulating valve and an opening/closing valve for low-speed injection, and a flow regulating valve and an opening/closing valve for high-speed injection. This valve can perform a smooth and quick operation with a comparatively small driving force and valve open state holding force and thus has a high practical value.

On the other hand, it is conventionally known to incorporate a run-around circuit that connects a rod-side chamber and a head-side chamber in the injection cylinder unit of, e.g., a die casting machine, in order to economize the amount of hydraulic operating fluid supplied from the hydraulic source to the head-side chamber of the cylinder, so that the piston is moved forward with as a minimum amount of hydraulic operating fluid. In the forward movement, the hydraulic operating fluid discharged from the rod-side chamber is introduced into the head-side chamber, and the piston is moved forward together with the hydraulic operating fluid supplied from the hydraulic source, e.g., an accumulator or a hydraulic pump.

Conventionally, when the flow regulating valve is incorporated in the hydraulic circuit of an injection cylinder having a run-around circuit, a meter-in or meter-out circuit is constituted.

Figure 3:
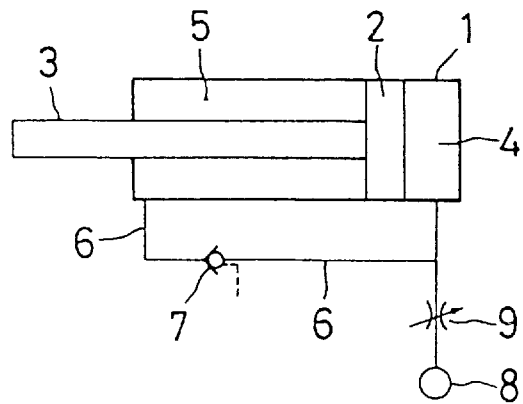

FIG. 3 shows a meter-in circuit in a simplified manner. Referring to FIG. 3, reference numeral 1 denotes a cylinder; 2, a piston, 3, a piston rod integrally formed with the piston 2; 4, a head-side chamber; 5, a rod-side chamber; 6, a run-around circuit connecting the rod-side chamber 5 and the head-side chamber 4; 7, a pilot check valve which is closed when the piston 2 is moved backward; and 8, a hydraulic source, e.g., an accumulator.

Reference numeral 9 denotes a known flow regulating valve described in, e.g., U.S. Pat. No. 4,586,539 mentioned above. The flow regulating valve 9 is incorporated between the hydraulic source 8 and the head-side chamber 4. In this case, since the flow regulating valve 9 is incorporated in the hydraulic operating fluid input side of the cylinder 1, the entire structure is called a meter-in circuit.

Figure 4:
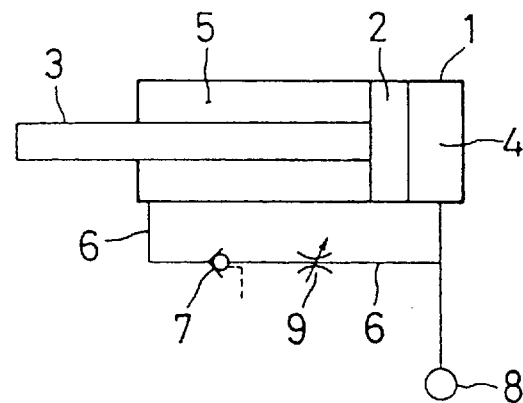

FIG. 4 shows a meter-out circuit in a simplified manner. In this case, no flow regulating valve is provided between a hydraulic source 8 and a head-side chamber 4, and a flow regulating valve 9 is provided at the output side of a rod-side chamber 5. Thus, the entire structure is called a meter-out circuit.

3. DISCLOSURE OF INVENTION

[Problem to be Solved by the Invention]

In the meter-in circuit shown in FIG. 3, during high-speed forward movement, as the valve opening degree of the flow regulating valve 9 is large, the movement of the piston 2 is stabilized. On the other hand, during low-speed forward movement, as the valve opening degree of the flow regulating valve 9 is decreased, the fluid immediately after being output from the hydraulic source 8 is restricted. Thus, the pressure of the hydraulic operating fluid becomes very low during low-speed forward movement. As a result, a quick response cannot be obtained, and the movement and speed of the piston 2 become unstable.

Figure 5:
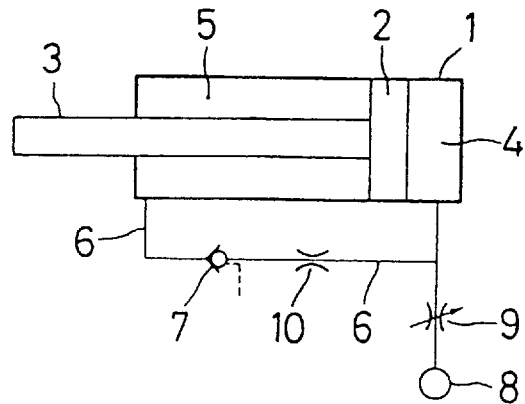

As shown in FIG. 5, the pressure of the hydraulic operating fluid can be increased by interposing a stationary restrictor 10 in a run-around circuit 6. When, however, the speed is to be increased, the pressure loss of the stationary restrictor 10 portion becomes large. Then, it is difficult to increase the speed.

In the meter-out circuit shown in FIG. 4, since the pressure of the hydraulic operating fluid of the hydraulic source 8 directly acts on the head-side chamber 4, the pressure of the hydraulic operating fluid of the head-side chamber 4 becomes almost equal to the pressure of the hydraulic source 8. In the injection cylinder unit of a die casting machine, this pressure is as very high as, e.g., 140 to 210 kg/cm$^2$. As a result, a very high surge pressure is generated during injection and filling, leading to a burr or flash.

A circuit is also considered, in which a meter-out structure shown in FIG. 4 is switched to a meter-in structure shown in FIG. 3 during injection. However, this complicates the circuit, and the speed pattern to be controlled is limited.

[Means of Solution to the Problem]

In the present invention, in order to solve the above problems, both the flow-in amount of hydraulic operating fluid flowing from a hydraulic source to a hydraulic cylinder having a run-around circuit and the flow-in amount of hydraulic operating fluid flowing from the run-around circuit to the hydraulic cylinder are controlled by a control valve simultaneously, thereby controlling the speed of the hydraulic cylinder.

In this case, both the flow-in amount of hydraulic operating fluid flowing from the hydraulic source to the hydraulic cylinder and the flow-in amount of hydraulic operating fluid flowing from the run-around circuit to the hydraulic cylinder are simultaneously controlled by the operation of one spool of one control valve, or are controlled simultaneously by the interlocked operations of different spools of control valves.

The flow-in amount of hydraulic operating fluid flowing from the hydraulic source to the hydraulic cylinder and the flow-in amount of hydraulic operating fluid flowing from the run-around circuit to the hydraulic cylinder are controlled simultaneously at a predetermined ratio.

In some cases, an apparatus having a run-around circuit, in which a flow-in amount control valve portion for controlling the flow-in amount of hydraulic operating fluid flowing from the run-around circuit to a hydraulic cylinder is arranged parallel to a restrictor for bypassing this flow-in amount control valve portion, is used, and the hydraulic operating fluid is caused to run around through the restrictor immediately after the start of forward movement of the hydraulic cylinder.

Furthermore, an apparatus that can practice these methods is formed as a speed control apparatus for a hydraulic cylinder, comprising a hydraulic cylinder having a run-around circuit, and a flow-in circuit of a hydraulic operating fluid flowing from a hydraulic source to the hydraulic cylinder, wherein a control valve for controlling both the flow-in amount of hydraulic operating fluid flowing from the hydraulic source to the hydraulic cylinder and the flow-in amount of hydraulic operating fluid flowing from the run-around circuit to the hydraulic cylinder is provided in a flow-in channel extending from the hydraulic source and the run-around circuit, or as any other apparatuses described in the appended claims.

[Effect]

With the above arrangement, when the spool is slid by operating the driving source of the flow control valve, the valve opening degree is changed, and both the flow-in amount of hydraulic operating fluid flowing from the hydraulic source to the hydraulic cylinder and the flow-in amount of hydraulic operating fluid flowing from the run-around circuit to the hydraulic cylinder are controlled simultaneously. The piston rod of the hydraulic cylinder is moved forward in accordance with the control amount.

During low-speed forward movement, both the portion that controls the flow-in amount of hydraulic operating fluid flowing from the hydraulic source to the hydraulic cylinder and the portion that controls the flow-in amount of hydraulic operating fluid flowing from the run-around circuit to the hydraulic cylinder have a small valve opening degree and thus have a small gap. Thus, these portions are restricted. Then, the pressure loss is large, and the pressure of the hydraulic operating fluid supplied from the hydraulic source is small.

However, as the portion that controls the flow-in amount of hydraulic operating fluid flowing from the run-around circuit is similarly restricted, the hydraulic operating fluid runs around and cannot flow easily. The pressure of the hydraulic operating fluid in the rod-side chamber is increased, and the pressure of the hydraulic operating fluid in the head-side chamber is also increased. As a result, the stiffness of the hydraulic operating fluid is increased, and the movement and speed of the piston are stabilized. Thus, the piston moves forward smoothly.

On the other hand, in high-speed forward movement, the valve opening degrees of the two control portions are increased, so that the gaps are increased and the pressure loss is decreased. Since a large amount of hydraulic operating fluid flows, the speed of forward movement is increased. In this case, although the pressure of the hydraulic operating fluid in the head-side chamber reaches a preset value, since the portion that controls the flow-in amount of hydraulic operating fluid flowing from the hydraulic source is also set at an appropriate valve opening degree, the maximum pressure of the hydraulic source does not directly act on the head-side chamber, and a peak pressure is not generated.

An almost constant hydraulic operating pressure can be maintained regardless of the speed of the cylinder, and a stable and continuous speed control operation can be performed in a range from a low to high speed.

4. BRIEF EXPLANATION OF THE DRAWINGS

Figure 2:
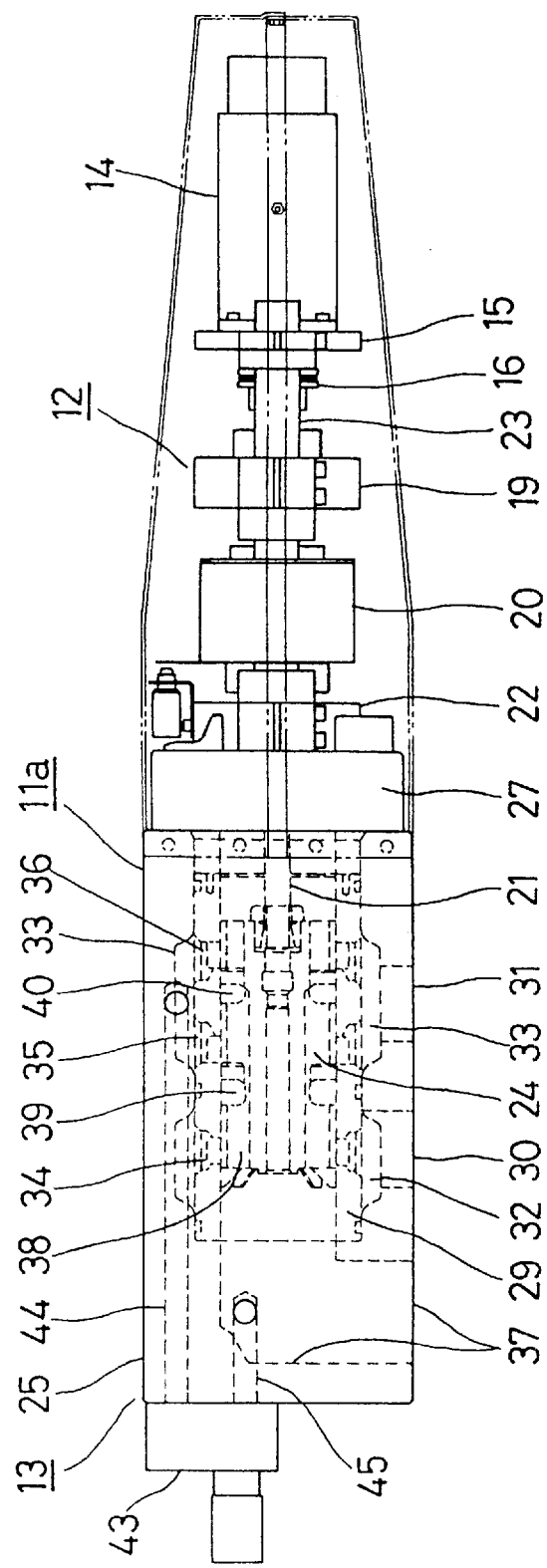
Figure 7:
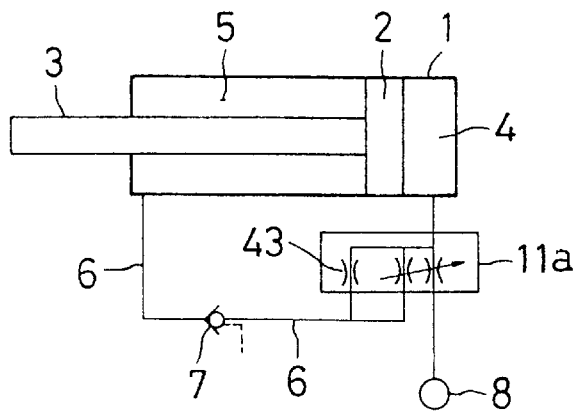
Figure 8:
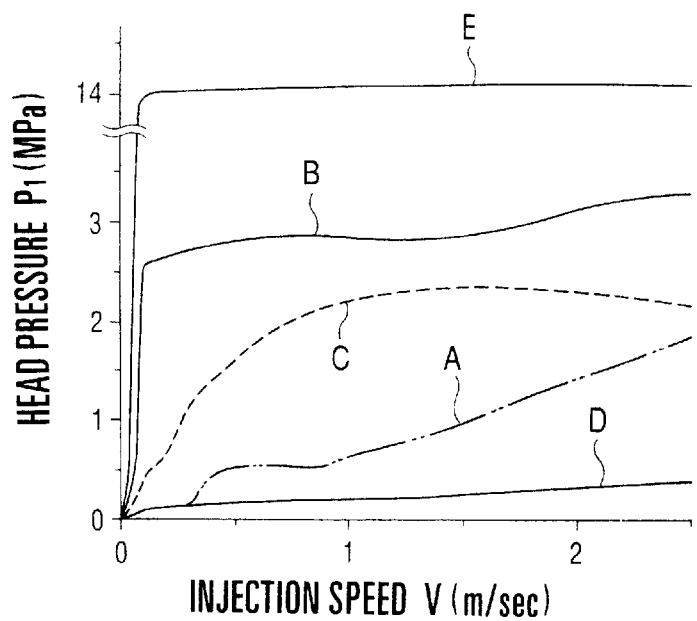
Figure 9:
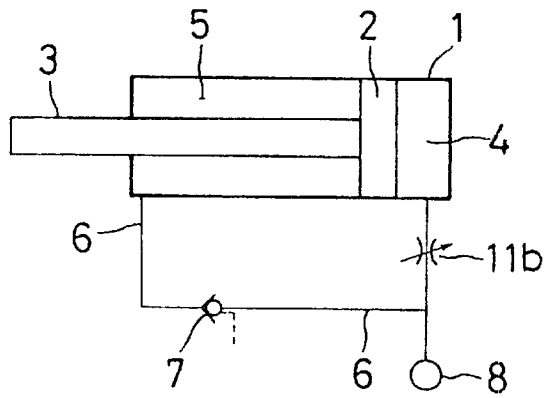

FIG. 1 is a longitudinal sectional view showing one embodiment of a flow control valve used in an apparatus for practicing a method of the present invention, FIG. 2 is a front view showing another embodiment of a flow control valve used for practicing the present invention, FIG. 3 is a hydraulic circuit diagram showing the first example of a prior art technique, FIG. 4 is a hydraulic circuit diagram showing the second example of a prior art technique, FIG. 5 is a hydraulic circuit diagram showing the third example of a prior art technique, FIG. 6 is a hydraulic circuit diagram showing one embodiment of an apparatus which incorporates the flow control valve shown in FIG. 1, FIG. 7 is a hydraulic circuit diagram showing another embodiment of an apparatus which incorporates the flow control valve shown in FIG. 2, FIG. 8 is a graph showing the relationship between the injection speed and the head pressure of the injection unit of a die casting machine, and FIG. 9 is a hydraulic circuit diagram showing still another embodiment of the present invention.

5. BEST MODE OF CARRYING OUT THE INVENTION

The present invention will be described in detail by way of the following embodiments.

FIG. 6 is a hydraulic circuit diagram showing one embodiment of an apparatus for practicing the method of the present invention in a simplified manner. FIG. 1 is a longitudinal sectional view showing one embodiment of a flow control valve incorporated in the apparatus shown in FIG. 6.

Referring to FIG. 6, similarly as in FIGS. 3 to 5, reference numeral 1 denotes a cylinder; 2, a piston, 3, a piston rod; 4, a head-side chamber; 5, a rod-side chamber; 6, a run-around circuit connecting the rod-side chamber 5 and the head-side chamber 4; 7, a pilot check valve which is closed during run-around mode and is closed when the piston is moved backward; and 8, a hydraulic source, e.g., an accumulator. The hydraulic source 8 includes a hydraulic pump (not shown) and its circuit. Reference numeral 11 denotes a flow control valve having a special structure, which constitutes the characteristic part of the present invention. The flow control valve 11 is provided across part of the flow-in channel extending from the hydraulic source 8 to the cylinder 1 and part of the run-around circuit 6. Reference numerals 30, 31, and 37 in FIG. 6 denote inlet/outlet ports corresponding to passages 30, 31, and 37 in FIG. 1.

FIG. 1 shows the structure of one embodiment of the flow control valve 11.

The flow control valve 11 is roughly constituted by a driving section 12 located at one end side and a flow control section 13 serving also as an opening/closing valve.

In the driving section 12, reference numeral 14 denotes a pulse motor having a rotation amount detecting unit. One end portion of a ball screw shaft 17 is coupled, through a coupling 16, to the output shaft of the pulse motor 14 mounted on a plate 15. Reference numeral 18 denotes a bearing mounted to a plate 19. A nut 20 for a ball screw is mounted on the ball screw shaft 17. The nut 20 meshes with the ball screw shaft 17 through balls (not shown). A connecting rod 21 is fixed on the distal end of the nut 20 to be coaxial with the nut 20. Two linear shafts 23 extend through the plates 15 and 19 and a plate 22 so as to slidably guide part of the nut 20 through a large number of balls.

In the flow control section 13, a valve spool 24 is slidably provided in a valve chamber 26 of a manifold 25 forming a valve body. One end side of the valve spool 24 is fixed to the distal end portion of the connecting rod 21 extending through a sleeve 28 of a sealed flange portion 27. Reference numeral 29 denotes a sleeve in which the valve spool 24 slides. The valve chamber 26 is divided into a front chamber 26a and a rear chamber 26b by the valve spool 24. The front chamber 26a communicates with the head-side chamber 4 of the cylinder 1 through the passage 37.

Two parallel supply holes 30 and 31 are formed in the side surface of the manifold 25. The supply hole 30 is connected to the hydraulic source 8, and the supply hole 31 is connected to the run-around circuit 6, i.e., the rod-side chamber 5 of the cylinder 1. Annular holes 32 and 33 communicating with the supply holes 30 and 31, respectively, are formed in the manifold 25.

Several passages 34 communicating with the annular hole 32 are radially formed in the sleeve 29 to be equidistant on the same circumference. A plurality of rows, e.g., two rows, of passages 35 and 36 communicating with the annular hole 33 are radially formed in the sleeve 29 in the axial direction to be equidistant on the same circumference.

A large number of through holes 38 extending in the axial direction are formed in the valve spool 24 to be parallel to each other on the same circumference. The front chamber 26a and the rear chamber 26b communicate with each other through the through holes 38. Annular grooves 39 and 40 communicating with intermediate portions of the through holes 38 are formed in the axially intermediate outer circumferential portion of the valve spool 24. Portions that directly connect and disconnect the front chamber 26a and the passages 34 with and from each other, and portions that indirectly connect and disconnect the front chamber 26a and the passages 35 and 36 with and from each other through the through holes 38 and the annular grooves 39 and 40, are provided in the axial direction of the valve spool 24. A plurality of almost triangular guide plates441 are radially mounted on the outer circumferential portion of the distal end face of the valve spool 24.

Several notches 42 are circumferentially formed in the outer circumferential portion of the distal end face of the valve spool 24 and the surface of the valve spool 24 on the rear end side of the annular grooves 39 and 40, i.e., on the surface of the valve spool 24 where the passages 35 and 36 are located. With a slight movement of the valve spool 24, the hydraulic operating fluid quickly flows from the passages 34 to the front chamber 26a and from the passages 35 and 36 to the annular grooves 39 and 40, respectively, thereby quickening the valve opening operation.

The two passages 35 and 36 communicating with the run-around circuit 6 are formed in the sleeve 29 to be parallel to each other in the axial direction, and the two annular grooves 39 and 40 corresponding to the passages 35 and 36 are formed to be parallel to each other in the axial direction, because of the following reason. If only one passage and one annular groove are provided, the flow channel is restricted by the passage and the annular groove. Then, although a high speed can be obtained, the pressure is undesirably increased, so that a peak pressure is generated, leading to a burr during injection. Although both the number of passages and the number of annular grooves may be one, if it is two or more, the head-side pressure of the cylinder 1 is decreased, so that the pressure peak is suppressed accordingly. Therefore, both the number of passages and the number of annular grooves are two or more.

Referring to FIG. 6, assuming that the pressure of the head-side chamber 4 is $P_1$, the pressure of the hydraulic source 8 is $P_0$, the sectional area of the head-side chamber 4 is $A_1$, the sectional area of the rod-side chamber 5 is $A_2$, the area of the flow channel between the passages 34 and the front chamber 26a communicating from the hydraulic source 8 to the head-side chamber 4 is $R_A$, the sum of the sectional areas of the flow channels between the passages 35 and 36 and the annular grooves 39 and 40 communicating from the run-around circuit 6 to the head-side chamber 4 is $R_B$, and the ratio of $R_B$ to $R_A$ is $\underline{k}$, the following equation (1) is obtained:

$$P_1 = A_2^3 / (A_1 - A_2)^3 K^2 + A_2^3 \cdot P_0 \tag{1}$$

Considering the injection circuit and the like of an ordinary die casting machine, when $A_1$ is defined as twice $A_2$, the following equation (2) is derived:

$$P_1 = 1/K^2 + 1 \cdot P_0 \tag{2}$$

Assume $P_0=140$ kg/cm$^2$. If k=1, then $P_1=70$ kg/cm$^2$. As shown in FIG. 1, if k=2, then $P_1=28$ kg/cm$^2$, so that the pressure of the head-side chamber 4 can be suppressed to a rather small value.

The operational pressure $P_1$, which is the pressure of the head-side chamber 4, becomes almost constant regardless of the forward-movement speed of the piston 2. This operational pressure $P_1$ can be arbitrarily set within a range of the pressure $P_0$ or less of the hydraulic source 8. Therefore, speed control can be stably and continuously performed in a range from a low to high speed.

In this apparatus, the dimensional ratios of the respective portions are set as indicated by the following equations (3), (4), and (5):

total sectional area of through holes 38 formed in valve spool 24/sectional area of valve spool 24=0.15 to 0.4 (3)

diameter in outer surface of through hole 38 closest to outer circumferential surface of valve spool 24 outer diameter of valve spool 24=0.77 to 0.93 (4)

diameter of connecting rod 21 outer diameter of valve spool 24=0.1 to 0.22 (5)

The number of through holes 38 is set to 6 or 8.

The operation of the apparatus shown in FIGS. 6 and 1 will be described.

To perform injection, the pulse motor 14 is operated while the flow control valve 11 is kept closed, and the valve opening degree of the flow control valve 11 is controlled in accordance with the injection speed. In a die casting machine, usually, the operation is initially performed at a low speed, and is then switched to a high speed midway.

When the valve spool 24 is moved backward by a desired amount by the operation of the pulse motor 14, thus opening the passage, the hydraulic operating fluid of the hydraulic source 8 enters the head-side chamber 4 of the cylinder 1 through the supply hole 30, the annular hole 32, the passages 34, the front chamber 26a, and the passage 37, and moves the piston 2 and the piston rod 3 forward.

As the piston 2 is moved forward, the hydraulic operating fluid in the rod-side chamber 5 of the cylinder 1 is sequentially pushed out from the rod-side chamber 5, passes through the run-around circuit 6 including the pilot check valve 7, the supply hole 31, the annular hole 33, the passages 35 and 36, the annular grooves 39 and 40, the through holes 38, the front chamber 26a, and the passage 37, merges with the hydraulic operating fluid flowing from the hydraulic source 8, enters the head-side chamber 4 of the cylinder 1, and moves the piston 2 and the piston rod 3 forward.

When the cylinder 1 is moved forward, the ratio of the valve opening degree of the portion that controls the flow-in amount of the hydraulic operating fluid flowing from the hydraulic source 8 to the head-side chamber 4 of the cylinder 1 to that of the portion that controls the flow-in amount of the hydraulic operating fluid flowing from the run-around circuit 6 to the head-side chamber 4 is not influenced by the speed but is constant. Therefore, the ratio in pressure loss of these two flow-in amount control portions is also not influenced by the speed but is constant.

During low-speed forward movement, as the valve opening degrees of these two portions are small and the gaps are thus small, the pressure loss from the hydraulic source 8 to the head-side chamber 4 is large. However, the pressure loss in the pipe at the run-around portion, the valve, and the like is also large. In the run-around circuit 6, since the pressure loss in the run-around portion and the pressure in the head-side chamber 4 of the cylinder 1 are proportional, when the pressure loss in the run-around portion is increased, the pressure in the head-side chamber 4 can be maintained to be high.

As a result, both the pressure of the head-side chamber 4 and the pressure of the rod-side chamber 5 can always be maintained to be high, the stiffness of the hydraulic operating fluid is increased, the speed controllability is improved, and the movement and speed are stabilized, so that the piston 2 is moved forward smoothly.

On the other hand, in high-speed forward movement, the valve opening degrees of the two control portions are increased, so that the gaps are increased and the pressure loss is decreased. Since a large amount of hydraulic operating fluid flows, the speed in the front chamber is increased. In this case, although the pressure of the hydraulic operating fluid in the head-side chamber 4 reaches a preset pressure, since the portion that controls the flow-in amount of the hydraulic operating fluid flowing from the hydraulic source 8 is also set at an appropriate valve opening degree, the maximum pressure of the hydraulic source 8 does not directly act on the head-side chamber, as described above. A peak pressure is not generated, or is suppressed to a surge pressure similar to that obtained with the meter-in structure.

An almost constant hydraulic operating pressure can be maintained regardless of the speed of the cylinder, and a stable and continuous speed control operation can be performed in a range from a low to high speed.

In the present invention, when both the flow-in amount of hydraulic operating fluid flowing from the hydraulic source 8 to the head-side chamber 4 of the cylinder 1 having the run-around circuit 6 and the flow-in amount of hydraulic operating fluid flowing from the run-around circuit 6 to the head-side chamber 4 are to be controlled simultaneously by the control valve, thereby controlling the forward-moving speed of the piston 2 of the cylinder 1, it is most preferable that both of these flow-in amounts be controlled simultaneously by the operation of one valve spool 24 of one flow control valve 11, as shown in FIG. 1. This can be performed by using two or more valve spools that are connected to each other in series in one flow control valve in the axial direction, or by arranging the valve spools of two or more flow control valves to be parallel to each other and driving the both valve spools mechanically or electrically in the interlocked manner.

As is understood from the above description, the flow control valve 11 is used, which sets a predetermined ratio of the flow-in area of the hydraulic operating fluid flowing from the hydraulic source 8 to the head-side chamber 4 of the cylinder 1 to the flow-in area of the hydraulic operating fluid flowing from the run-around circuit 6 to the head-side chamber 4. This ratio can be 1:2, as shown in FIG. 1, or can be arbitrarily set to another ratio, so that the pressure of the hydraulic operating fluid in the head-side chamber 4 can be properly set without changing the pressure of the hydraulic source 8.

In the embodiment shown in FIG. 6, the pressure of the head-side chamber 4 of the cylinder 1 is almost constant regardless of the injection speed, as described above. Therefore, a head pressure of as high as about 30 kg/cm$^2$ (=about 3 MPa) is obtained even during low-speed injection, so that the surge pressure is increased. Since a high head pressure is required even at the start of injection, a rather long start time is needed. Sometimes the low-speed injection speed may be more or less unstable immediately after the start. This may be because vibration tends to occur immediately after the start. In an actual experiment, however, such an unstable phenomenon did not occur. This may be because the range where the pressure rapidly changes is a speed range or less with which leakage occurs in the flow control valve 11.

If the low-speed injection speed becomes more or less unstable immediately after the start, for example, the head pressure may be increased to be higher than that in the meter-in circuit shown in FIGS. 3 and 5, and is then decreased to be lower than that in the one embodiment of the present invention shown in FIG. 6. Then, the operation at the start is made slightly similar to that in the meter-in circuit, thereby further stabilizing the low-speed injection speed immediately after the start.

FIG. 7 shows the embodiment of such a circuit. In FIG. 7, in addition to the components shown in FIG. 6, a restrictor 43 for bypassing a flow-in amount control valve portion that controls the flow-in amount of hydraulic operating fluid flowing from a run-around circuit 6 to a head-side chamber 4 of a cylinder 1, is provided to be parallel to the flow-in amount control valve portion. Immediately after the start of the forward movement of a piston 2, the hydraulic operating fluid is caused to run around through the restrictor 43.

FIG. 2 shows a flow control valve 11a obtained by incorporating a restrictor 40 in the flow control valve 11 shown in FIG. 1. Reference numeral 43 denotes the restrictor mounted on the side surface of a manifold 25. The restrictor 43 is provided between a supply hole 31 or an annular hole 33 and a passage 37 through passages 44 and 45. Referring to FIG. 2, the same portions as in FIG. 1 are denoted by the same reference numerals, and a detailed description thereof will be omitted.

In this case, in the low-speed injection, the hydraulic operating fluid that runs around flows in the restrictor 43 side. When a large flow amount is required in the high-speed injection, the hydraulic operating fluid flows between passages 35 and 36, that are opened wide by the operation of a pulse motor 14, and annular grooves 39 and 40. Therefore, in the low-speed range, the head pressure can be slightly decreased, so that the operation is stabilized even at the start.

The head pressure can be freely adjusted within the range of a pressure response relationship of the meter-in circuit and the circuit shown in FIG. 6 by adjusting the restricting degree of the restrictor 43.

FIG. 8 shows the relationship between an injection speed V and the pressure $P_1$ of the head-side chamber 4 of the cylinder 1. Referring to FIG. 8, reference symbol A indicates a case wherein the meter-in circuit shown in FIG. 5 is used; B, a case wherein the circuit of the one embodiment of the present invention shown in FIG. 6 is used; C, a case wherein the circuit of another embodiment of the present invention shown in FIG. 7 is used; D, a case wherein the meter-in circuit shown in FIG. 3 is used; and E, a case wherein the meter-out circuit shown in FIG. 4 is used. FIG. 8 shows that the above description is correct. In FIG. 8, both the injection speed V and the head pressure $P_1$ are given in scales at an equal pitch.

In the above embodiments, the control operation of the injection speed of the die casting machine has been mainly described. However, the present invention is not limited to this, but can be used for operation of the cylinder of the injection unit of an injection molding machine or of a blow molding machine, or of any other general hydraulic equipment.

In the embodiment shown in FIG. 6, the single flow control valve 11 for simultaneously controlling both the flow-in amount of hydraulic operating fluid flowing from the hydraulic source 8 to the cylinder 1 and the flow-in amount of hydraulic operating fluid flowing from the run-around circuit 6 to the cylinder 1, is provided at a portion where a flow channel portion extending from the rod-side chamber 5 of the cylinder 1 of the run-around circuit 6 intersects a flow channel portion extending from the hydraulic source 8, or at a portion immediately before this intersecting portion. However, a flow control valve 11 having one flow amount control spool may be provided after the portion where the flow channel portion extending from the rod-side chamber 5 of the cylinder 1 of the run-around circuit 6 intersects the flow channel portion extending from the hydraulic source 8, that is, at a flow channel portion between this intersecting portion and the head-side chamber 4 of the cylinder 1. FIG. 9 shows this embodiment. Referring to FIG. 9, reference numeral 11b denotes a flow control valve. In FIG. 9, the same portions as in FIG. 6 are denoted by the same reference numerals, and a detailed portion thereof will be omitted. With this arrangement, as the flow control valve 11 has only one flow control section, the ratio $\underline{k}$ of the sectional area $R_B$ of the flow channel extending from the run-around circuit 6 to the sectional area $R_A$ of the flow channel extending from the hydraulic source 8, which has been described with reference to FIG. 6, becomes 1, and this ratio $\underline{k}$ cannot be arbitrarily changed.

In the present invention, since the speed of the hydraulic cylinder is controlled by controlling both the flow-in amount of hydraulic operating fluid flowing from the hydraulic source to the hydraulic cylinder having the run-around circuit and the flow-in amount of hydraulic operating fluid flowing from the run-around circuit to the hydraulic cylinder simultaneously with the control valve, the speed controllability is improved even in low-speed forward movement. Therefore, the movement and speed of the cylinder are stabilized, so that the cylinder is moved forward smoothly.

More specifically, when the cylinder is moved forward, the ratio of the valve opening degree of the portion that controls the flow-in amount of the hydraulic operating fluid flowing from the hydraulic source to the head-side chamber of the cylinder 1 to that of the portion that controls the flow-in amount of the hydraulic operating fluid flowing from the run-around circuit to the head-side chamber is not influenced by the speed but is constant. Therefore, the pressure loss ratio of these two flow-in amount control portions is not influenced by the speed but is constant accordingly.

During low-speed forward movement, as the valve opening degrees of these two portions are small and the gaps are thus small, the pressure loss from the hydraulic source to the head-side chamber is large. However, the pressure loss in the pipe at the run-around portion, the valve, and the like is also large. In the run-around circuit, since the pressure loss in the run-around portion and the pressure in the head-side chamber of the cylinder are proportional, when the pressure loss in the run-around portion is increased, the pressure in the head-side chamber can be maintained to be high.

As a result, both the pressure of the head-side chamber and the pressure of the rod-side chamber can always be maintained to be high, the stiffness of the hydraulic operating fluid is increased, the speed controllability is improved, and the movement and speed are stabilized, so that the piston is moved forward smoothly.

During high-speed forward movement, the valve opening degrees of the two control portions are increased, so that the gaps are increased and the pressure loss is decreased. Since a large amount of hydraulic operating fluid flows, the speed of the forward movement is increased. In this case, although the pressure of the hydraulic operating fluid in the head-side chamber reaches a preset pressure, since the portion that controls the flow-in amount of the hydraulic operating fluid flowing from the hydraulic source is also set at an appropriate valve opening degree, the maximum pressure of the hydraulic source does not directly act on the head-side chamber, as described above. The peak pressure is not generated, or is suppressed to a surge pressure similar to that obtained with the meter-in structure.

An almost constant hydraulic operating pressure can be maintained regardless of the speed of the cylinder 1, and a stable and continuous speed control operation can be performed in a range from a low to high speed.

Since the flow-in amount of hydraulic operating fluid flowing from the hydraulic source to the hydraulic cylinder and the flow-in amount of hydraulic operating fluid flowing from the run-around circuit to the hydraulic cylinder are controlled at a predetermined ratio, an appropriate operational pressure of the head-side chamber can be selected by properly selecting this ratio. Thus, a stable operation and a pressure less influenced by the surge pressure can be obtained.

If an apparatus having a run-around circuit, in which a flow-in amount control valve portion for controlling the flow-in amount of hydraulic operating fluid flowing from the run-around circuit to a hydraulic cylinder is arranged parallel to a restrictor for bypassing this flow-in amount control valve portion, is used, and the hydraulic operating fluid is caused to run around through the restrictor immediately after the start of the forward movement of a hydraulic cylinder, then in the low-speed injection, the hydraulic operating fluid that runs around flows in the restrictor side. When a large flow amount is required in the high-speed injection, the hydraulic operating fluid flows between passages, that are opened wide by the operation of a pulse motor, and annular grooves. Therefore, in the low-speed range, the head pressure can be slightly decreased, so that the operation is stabilized even at the start.

The head pressure can be freely adjusted by adjusting the restricting degree of the restrictor.

Therefore, if these arrangements are employed in the injection unit of, e.g., a die casting machine, the speed is stabilized both in high and low speeds, and an unnecessary peak pressure is not generated. Therefore, a smooth, good injection operation having a high response speed can be obtained, so that an injection product having a higher quality can be obtained.

As the speed is stabilized, injection feed-back control and ultra low-speed injection control with the speed of, e.g., 0.02 to 0.1 m/sec can be enabled.

When the flow control valve and the speed control apparatus according to the present invention are employed, the entire system is downsized, and the installation area can be decreased, as a matter of course.

We claim:

1. A speed control method for a hydraulic cylinder having a meter-in circuit wherein a flow-in amount of hydraulic operating fluid flowing from a hydraulic source to said hydraulic cylinder is controlled by a control valve, said hydraulic cylinder having a run-around circuit and a flow-out amount of hydraulic operating fluid flowing from said run-around circuit to said hydraulic cylinder is controlled simultaneously by said control valve.

2. A speed control method for a hydraulic cylinder according to claim 1, wherein both the flow-in amount of hydraulic operating fluid flowing from said hydraulic source to said hydraulic cylinder and the flow-out amount of hydraulic operating fluid flowing from said run-around circuit to said hydraulic cylinder are simultaneously controlled by an operation of one spool of one control valve.

3. A speed control method for a hydraulic cylinder according to claim 1, wherein both the flow-in amount of hydraulic operating fluid flowing from said hydraulic source to said hydraulic cylinder and the flow-out amount of hydraulic operating fluid flowing from said run-around circuit to said hydraulic cylinder are simultaneously controlled by interlocked operations of different spools of control valves.

4. A speed control method for a hydraulic cylinder according to claim 1, wherein the flow-in amount of hydraulic operating fluid flowing from said hydraulic source to said hydraulic cylinder and the flow-out amount of hydraulic operating fluid flowing from said run-around circuit to said hydraulic cylinder are controlled at a predetermined ratio.

5. A speed control method for a hydraulic cylinder according to claim 1, wherein an apparatus having said run-around circuit, in which a flow-out amount control valve portion for controlling the flow-out amount of hydraulic operating fluid flowing from said run-around circuit to said hydraulic cylinder is arranged parallel to a restrictor for bypassing said flow-out amount control valve portion, is used, and the hydraulic operating fluid is caused to run around through said restrictor immediately after a start of forward movement of said hydraulic cylinder.

6. A speed control apparatus comprising a hydraulic cylinder having a meter-in circuit wherein a flow-in amount of hydraulic operating fluid flowing from a hydraulic source to said hydraulic cylinder is controlled by a control valve, said hydraulic cylinder, having a run-around circuit and a flow-out amount of hydraulic operating fluid flowing from said run-around circuit to said hydraulic cylinder is also controlled by said control valve.

7. A speed control apparatus for a hydraulic cylinder according to claim 6, wherein a control valve having one spool is used as said control valve for simultaneously controlling both the flow-in amount of hydraulic operating fluid flowing from said hydraulic source to said hydraulic cylinder and the flow-out amount of hydraulic operating fluid flowing from said run-around circuit to said hydraulic cylinder.

8. A speed control apparatus for a hydraulic cylinder according to claim 6, wherein a control valve capable of driving a plurality of spools in an interlocked manner is used as said control valve for simultaneously controlling both the flow-in amount of hydraulic operating fluid flowing from said hydraulic source to said hydraulic cylinder and the flow-out amount of hydraulic operating fluid flowing from said run-around circuit to said hydraulic cylinder.

9. A speed control apparatus for a hydraulic cylinder according to claim 6, wherein a control valve which presets a flow-in area of the hydraulic operating fluid flowing from said hydraulic source to said hydraulic cylinder and a flow-out area of the hydraulic operating fluid flowing from said run-around circuit to said hydraulic cylinder at a predetermined ratio is used as said control valve for simultaneously controlling the flow-in amount of hydraulic operating fluid flowing from said hydraulic source to said hydraulic cylinder and the flow-out amount of hydraulic operating fluid flowing from said run-around circuit to said hydraulic cylinder.

10. A speed control apparatus for a hydraulic cylinder according to claim 6, wherein a restrictor for bypassing a flow-out amount control valve portion that controls the flow-out amount of hydraulic operating fluid flowing from said run-around circuit to said hydraulic cylinder is arranged in said run-around circuit to be parallel to said flow-out amount control valve portion for the hydraulic operating fluid.

11. A speed control apparatus for a hydraulic cylinder according to claim 6, wherein said apparatus has, as a control valve, a flow control valve in which a valve spool is slidably provided as a control valve in a valve chamber of a manifold, and connected to a pulse motor through a rotary slide-driving unit and a connecting rod extending through a wall portion that seals one end of said valve spool, a first supply hole communicating with said hydraulic source and a second supply hole communicating with said run-around circuit are formed in a side surface of said manifold to be parallel to each other in an axial direction, a plurality of through holes extending in said valve spool in an axial direction are provided to be parallel to each other on the same circumference, an annular groove communicating with intermediate portions of the through holes is formed in an axially intermediate outer circumferential portion of the through holes, and a portion that directly connects and disconnects a front chamber of said valve chamber and the first supply hole with and from each other, and a portion that indirectly connects and disconnects said front chamber of said valve chamber and the second supply hole with and from each other through the annular groove are provided parallel to each other in the axial direction of said valve spool, said front chamber of said valve chamber communicating with a head-side chamber of said hydraulic cylinder.

12. A speed control apparatus for a hydraulic cylinder according to claim 11, wherein the second supply hole and the annular groove corresponding to the second supply hole respectively comprise a plurality of second axial supply holes and a plurality of axial annular grooves.

* * * * *